United States Patent [19]
Nakano et al.

[11] Patent Number: 5,311,962
[45] Date of Patent: May 17, 1994

[54] SEAT RECLINING MECHANISM AND SHIFT LEVER INTERLOCK SYSTEM

[75] Inventors: Nobuyuki Nakano; Takuya Tomike, both of Kanagawa, Japan

[73] Assignee: Ikeda Bussan Co., Ltd., Ayase City, Japan

[21] Appl. No.: 993,853

[22] Filed: Dec. 21, 1992

[30] Foreign Application Priority Data

Dec. 20, 1991 [JP] Japan .................. 3-338915

[51] Int. Cl.⁵ .................................. B60K 28/02
[52] U.S. Cl. .................................. 180/271; 180/336; 297/217; 74/473 R
[58] Field of Search ............... 180/271, 272, 336, 273; 297/217; 74/473 R

[56] References Cited

U.S. PATENT DOCUMENTS

| | | | |
|---|---|---|---|
| 3,715,002 | 2/1973 | Halls et al. | 180/271 |
| 4,398,618 | 8/1983 | Hansen | 180/336 X |
| 4,429,761 | 2/1984 | Haddock, Jr. et al. | 180/271 |
| 4,478,307 | 10/1984 | Natzke et al. | 180/273 |
| 4,884,668 | 12/1989 | Kobayashi et al. | 192/4 A |

FOREIGN PATENT DOCUMENTS

63-149237  6/1988  Japan .

Primary Examiner—Margaret A. Focarino
Assistant Examiner—Peter C. English
Attorney, Agent, or Firm—Foley & Lardner

[57] ABSTRACT

In a motor vehicle, a manual shift lever having shift positions including a parking position, and a reclining seat including a seat cushion and a seat back tiltable relative to the seat cushion between an upright position and a reclined position. Two switches are provided for detecting the parking position of the shift lever and the upright position of the reclining seat, respectively. The seat back is prevented from shifting toward the reclined position when the shift lever is not in the parking position. The shift lever is prevented from moving out of the parking position when the seat back is in the reclined position.

8 Claims, 9 Drawing Sheets

SEAT RECLINING MECHANISM AND SHIFT LEVER INTERLOCK SYSTEM

BACKGROUND OF THE INVENTION

The present invention relates to a motor vehicle wherein a seat of the reclining type is installed, and more particularly to a reclining mechanism for a seat for a motor vehicle.

Japanese Patent Application First Publication (JP-A) 63-149237 discloses a system for controlling a seat back of a seat of the reclining type. According to this known system, the seat back is prevented from tilting toward a reclined position beyond a limited tilted position when the adjacent rear seat is occupied by a seat occupant.

SUMMARY OF THE INVENTION

According to one aspect of the present invention, there are provided in a motor vehicle:

a manual shift lever having a plurality of shiftable positions including a parking position;

a reclining seat including a seat cushion and a seat back, said seat back having an upright position and a reclined position;

first sensor means for detecting whether said shift lever is placed at said parking position or not and generating a parking position indicative signal when said shift lever is placed at said parking position;

means for preventing said seat back from shifting toward said reclined position in response to absence of said parking position indicative signal;

second sensor means for detecting whether said seat back is shifted to said upright position or not and generating an upright position indicative signal when said seat back is shifted to said upright position; and means for preventing said shift lever from moving out of said parking position in response to absence of said upright position indicative signal.

According to another aspect of the present invention, there is provided a system for controlling a seat back which is shiftable relative to a seat cushion between an upright position and a reclined position, the system comprising:

means for generating an output signal;

means for preventing the seat back from shifting toward the reclined position in response to an absence of said output signal;

means for detecting whether the seat back is shifted to said upright position or not and generating an upright position indicative signal when the seat back is shifted to said upright position;

a manual shift lever having a plurality of positions and being shiftable between said plurality of positions thereof; and means for locking said manual shift lever, but allowing said manual shift lever to shift between said plurality of positions thereof in response to said upright position indicative signal and the absence of said output signal.

According to still another aspect of the present invention, there is provided a reclining mechanism for controlling a seat back which is tiltable relative to a seat cushion between an upright position and a reclined position, the reclining mechanism comprising:

a pivot shaft;
a base adapted to be fixed to the seat cushion;
an arm adapted to be fixed to the seat back;
a first ring gear fixed to said base;
a second ring gear fixed to said arm;
a sun gear fixedly coupled with said pivot shaft for rotation therewith;
a pinion carrier rotatably coupled with said pivot shaft;
a plurality of pinions rotatably supported by said pinion carrier, each of said plurality of pinions being in meshing engagement between said sun gear and said first ring gear and between said sun gear and said second ring gear;
a counter shaft rotatably supported by said arm, said counter shaft having one end fixed to a control member and an opposite end;
a gear train drivingly interconnecting said opposite end of said counter shaft and said pivot shaft, said gear train having a set of intermeshed gears having one gear fixedly coupled with said counter shaft and the other gear fixedly coupled with said pivot shaft;
a solenoid operated unit fixed to said arm, said solenoid operated unit including a lock pin; and
groove means fixed to said the other gear of said gear train for receiving said lock pin when said arm assumes a predetermined relationship with said base.

DESCRIPTION OF THE PREFERRED EMBODIMENT

Figure 1:
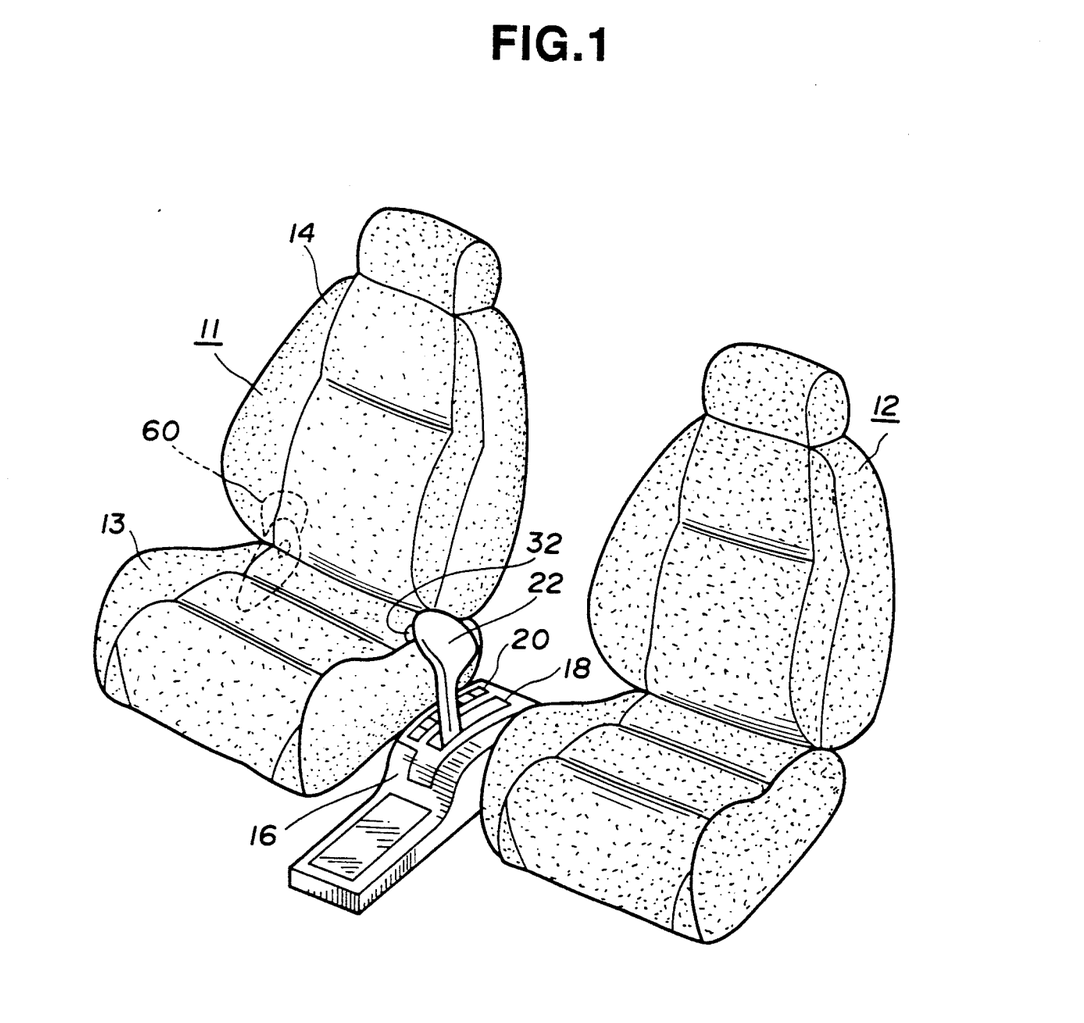
FIG. 1 is a perspective view of a seat arrangement in a front compartment of a vehicle, into which a seat reclining position control apparatus according to the present invention is incorporated.
Figure 2:
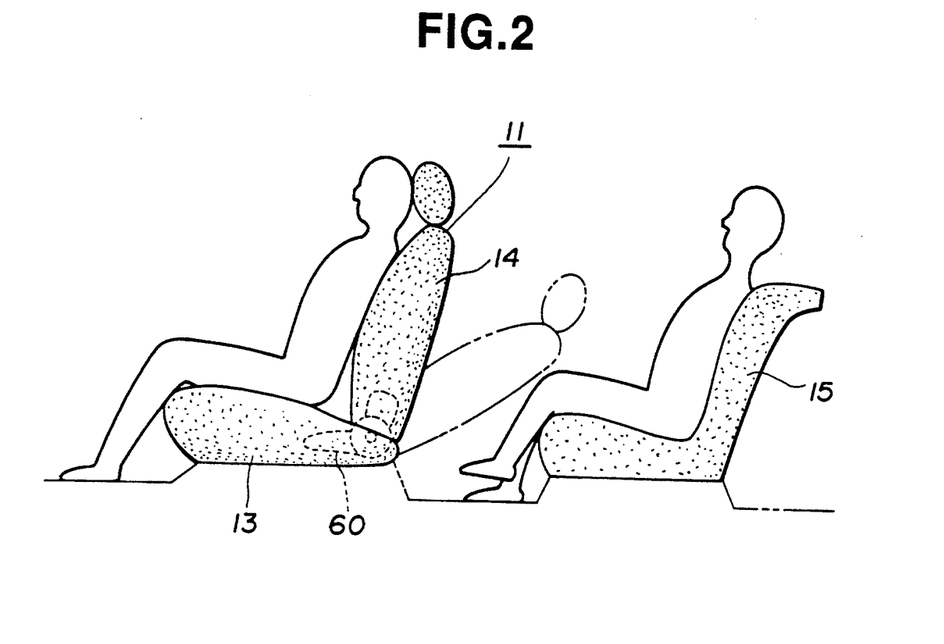
FIG. 2 is a schematic side view showing a relation between a front seat and a rear seat.
Figure 10:
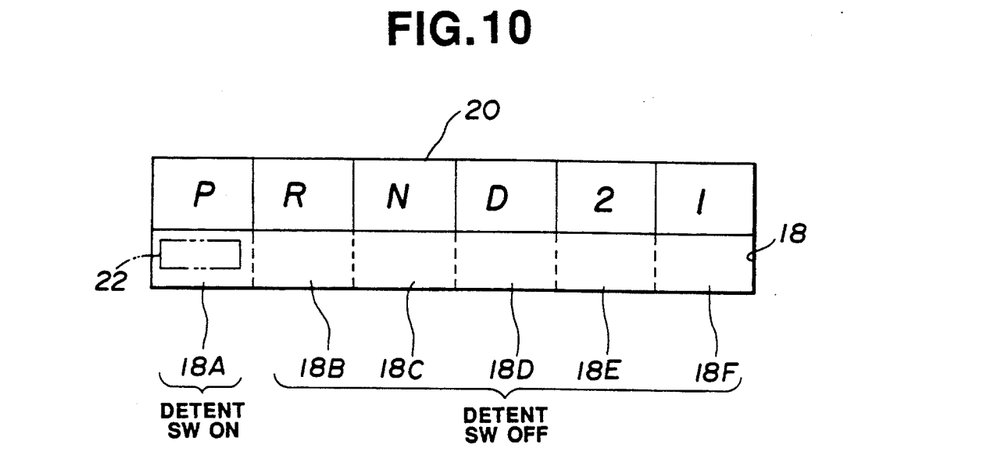
FIG. 10 is a plan view of a shift position indicator for the shift lever, showing respective shift positions.

Referring now to FIGS. 1 and 2, there is shown a schematic view of a seat arrangement in a front compartment of a vehicle equipped with an automatic transmission. Installed on a floor of the front compartment are two front seats including a passenger seat 11 and a driver seat 12, between which a console box 16 is disposed. The console box 16 has a rear portion formed as a shifter assembly case. On an upper curved surface of the case, there is provided a guide slot 18 through which a manual shift lever 22 projects upwardly. The shift lever 22 is movable forwardly and rearwardly along the guide slot 18. A shift position indicator 20 is disposed along the guide slot 18 on the upper surface of the case 16 and indicates shift positions for the shift lever 22. As seen in FIG. 10, the shift positions include parking (P), reverse (R), neutral (N), driving (D), first gear (1) and second gear (2) positions. A rear seat 15 is installed in a rear compartment of the vehicle in rearwardly spaced relation to the front seats 11 and 12, as seen in FIG. 2.

Figure 3:
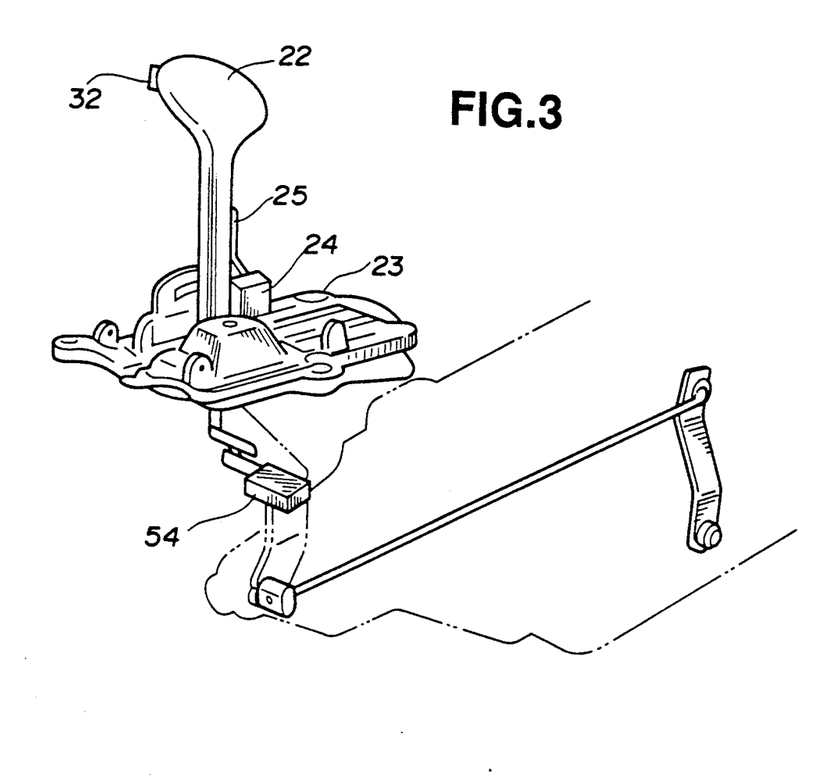
FIG. 3 is a perspective view of a shifter assembly including a shift lever locking mechanism.

Referring to FIG. 3, there is shown a perspective view of a shifter assembly including the manual shift lever 22 as shown in FIG. 1. The shift lever 22 is pivotally movable relative to a lever bracket 23. Secured to the lever bracket 23 is a parking switch or detent switch 24 as shown in FIG. 3. The detent switch 24 includes a switch rod 25 extending upwardly therefrom along the shift lever 22. The switch rod 25 is moved following a motion of the shift lever 22. The detent switch 24 is designed to be turned on when the shift lever 22 is located in a parking position 18A, as indicated in a phantom line in FIG. 10, corresponding to the shift position P on the indicator 20, and turned off when the shift lever 22 is placed in other shift positions 18B, 18C, 18D, 18E and 18F corresponding to the shift positions R, N, D, 2 and 1 on the indicator 20.

Figure 4:
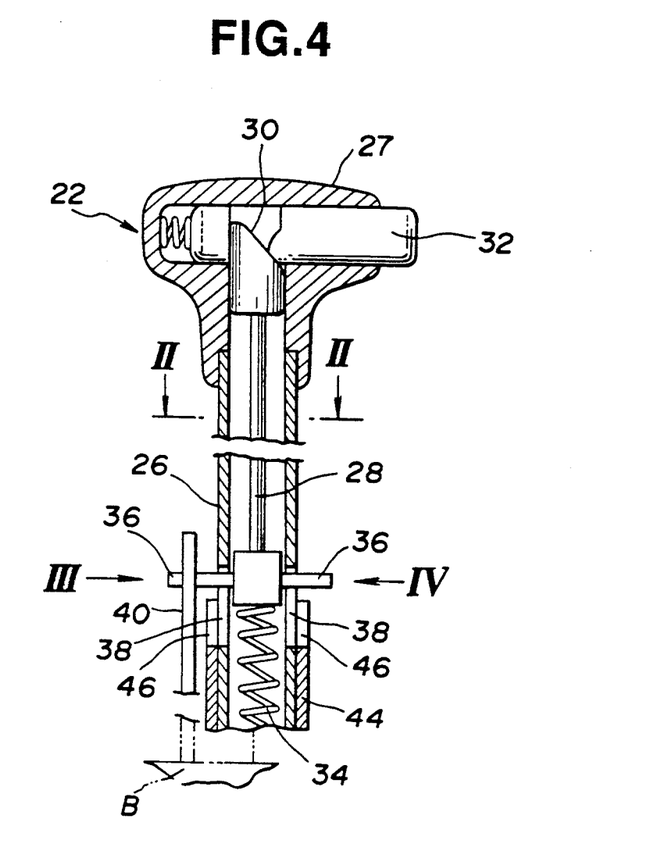
FIG. 4 is a sectional view of the shifter assembly.
Figure 6:
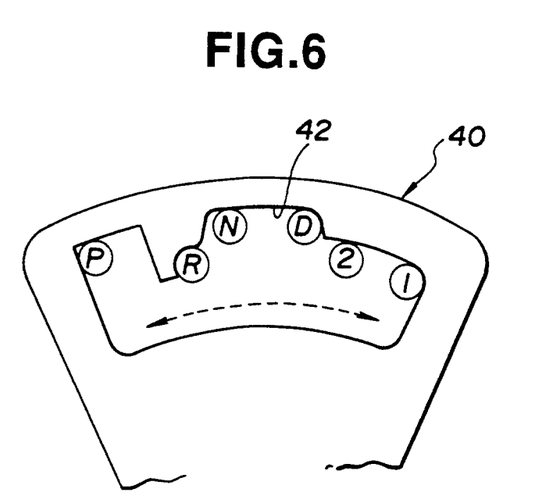
FIG. 6 is a view taken in the direction of the arrow III of FIG. 4.
Figure 7:
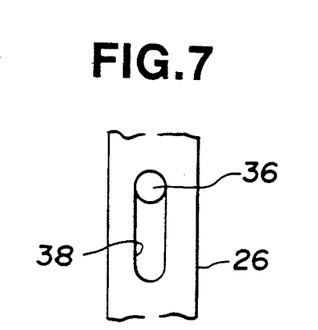
FIG. 7 is a view taken in the direction of the arrow IV of FIG. 4.

As shown in FIG. 3, a shift lever locking mechanism is disposed beneath the lever bracket 23 to lock the shift lever 22 in a selected shift position in a well known manner. Although the locking mechanism is indicated schematically in FIG. 3, various types of solenoid operated devices capable of locking the shift lever, are employable in the present invention. An example of such devices is disclosed in the U.S. Pat. No. 4,884,668 which is incorporated herein by reference. Referring to FIGS. 4 through 9, there is shown the prior art shift lever locking mechanism which can cooperate with the manual shift lever 22. The shift lever 22 includes a hollow shaft 26 pivotally mounted on a vehicle body B and a knob 27 secured to a top end of the hollow shaft 26. A rod 28 vertically extends through the hollow shaft 26 and has a tapered cam 30 at its upper end. The cam 30 is engaged with a release button 32 which is laterally slidably mounted in the knob 27. The lower end of the rod 28 is connected with a coil spring 34 which urges the rod 28 upwardly. As shown in FIGS. 4 and 7, the rod 28 is provided at the lower end with a shift position pin 36 both ends of which project radially outwardly from a pair of diametrically opposed openings 38, 38 of the hollow shaft 26. One end of the shift position pin 36 is fitted into an opening 42 of a shift position plate 40 as seen in FIG. 6, which is secured to the vehicle body B. The shift position plate 40 has predetermined shift positions including a parking position P as seen in FIG. 6 along the periphery of the opening 42.

Figure 5:
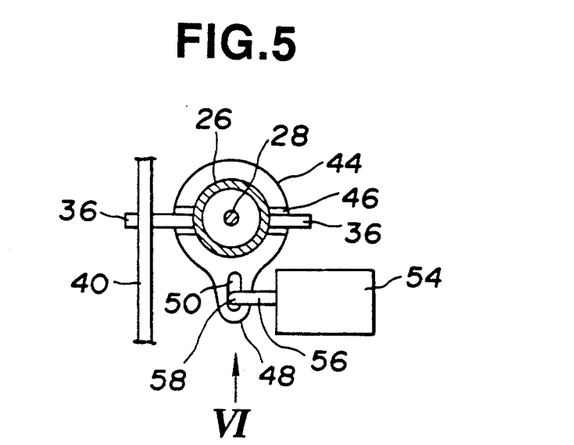
FIG. 5 is a sectional view taken along the line II—II of FIG. 4.
Figure 8:
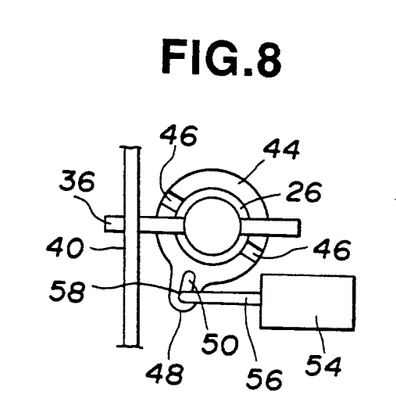
FIG. 8 is a view similar to FIG. 5 but showing the shift lever locking mechanism in a different condition.
Figure 9:
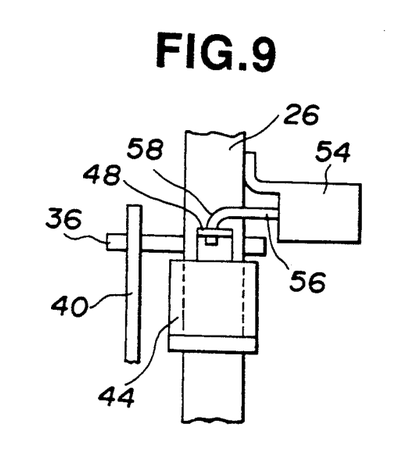
FIG. 9 is a view taken in the direction of the arrow VI of FIG. 5.

Received on the hollow shaft 26 is a sleeve 44 which is formed with a pair of diametrically opposed grooves 46, 46 and an ear portion 48 with a slot 50 as shown in FIG. 5. A bent end 58 of a lock pin 56 projecting from a solenoid operated unit 54 is engaged with the slot 50 of the sleeve 44. The solenoid operated unit 54 is designed in such a manner as described hereinafter. Namely, when the lock pin 56 of the solenoid operated unit 54 projects outwardly from the solenoid operated unit 54, the sleeve 44 has a first position where the grooves 46, 46 of the sleeve 44 are misaligned with the shift position pin 36, 36 as shown in FIG. 8. In this condition, the rod 28 is prevented from a downward movement caused by depressing the release button 32. Thus, the shift lever 22 is locked at the parking position. On the other hand, when the lock pin 56 of the solenoid operated unit 54 retracts into the solenoid operated unit 54, the sleeve 44 has a second position where the grooves 46, 46 are aligned with the shift position pin 36, 36 as seen in FIG. 5. Then, the rod 28 is allowed to move downwardly in response to depressing the release button 32. Accordingly, the shift lever 22 is unlocked to be shiftable from the parking position to other shift positions.

As seen in FIG. 1, the front seat 11 comprises a seat cushion 13 disposed in a substantially parallel relationship to the floor and a seat back 14 which is angularly displaceable relative to the seat cushion 13 by a reclining mechanism 60, for example, toward the rear seat 15 as seen in a phantom line in FIG. 2.

Figure 11:
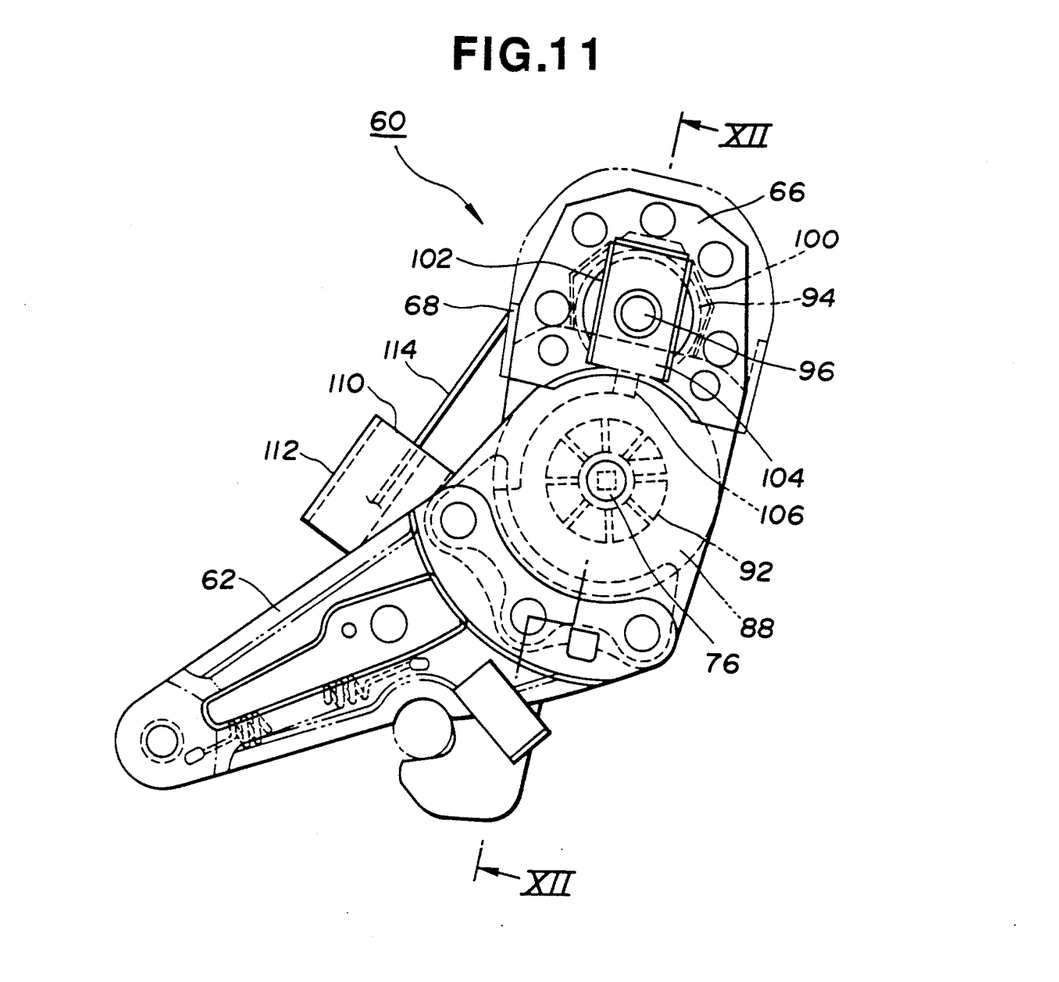
FIG. 11 is a sectional view of the reclining mechanism according to the present invention.
Figure 12:
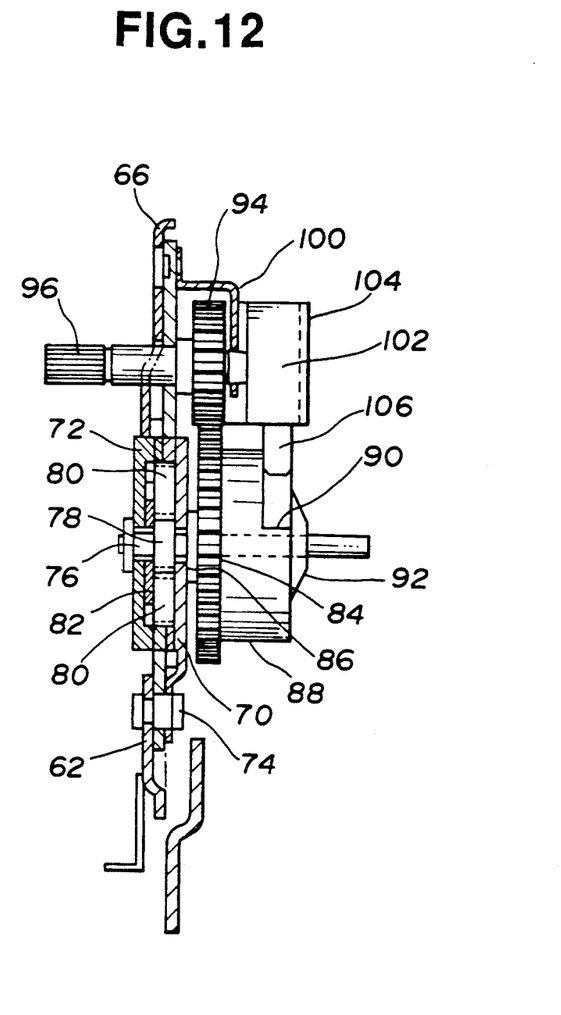
FIG. 12 is a lateral sectional view of the reclining mechanism taken along the line XII—XII of FIG. 11.
Figure 13:
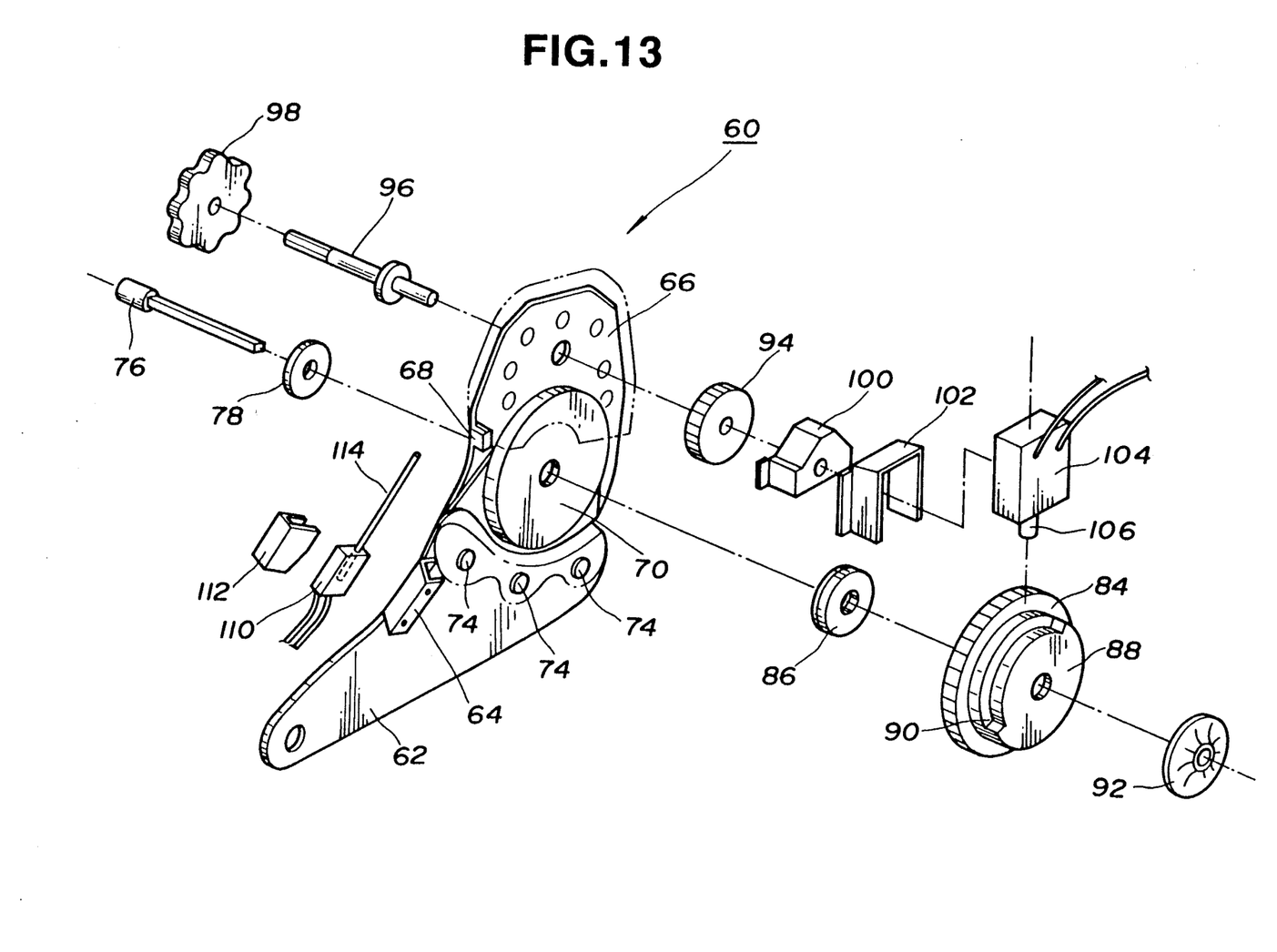
FIG. 13 is an exploded view of the reclining mechanism.
Figure 14:
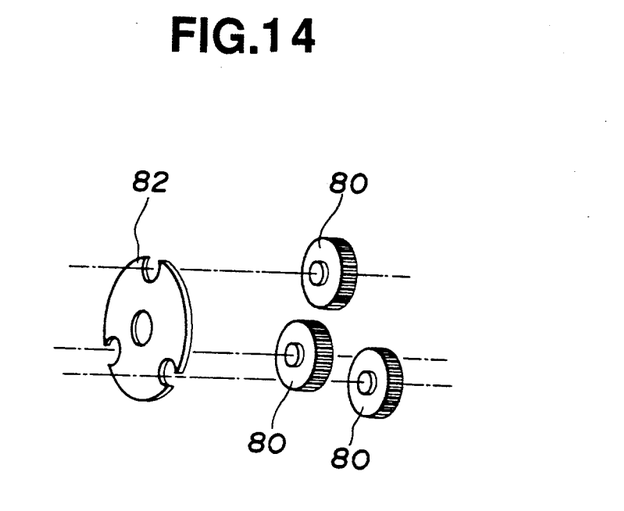
FIG. 14 is an exploded view of a planetary gear set including pinion planets and a planet carrier.

As shown in FIGS. 11 to 13, the reclining mechanism 60 includes a substantially triangular base plate 62 secured to a rear portion of the seat cushion 13 and a support arm 66 secured to a lower end portion of the seat back 14. A first gear plate 70 is secured to an upper portion of the base plate 62 by rivets 74. Secured to a lower portion of the support arm 66 is a second gear plate 72 as seen in FIG. 12. The first and second gear plates 70 and 72 are formed integrally with ring gear portions, respectively. The ring gear portions of the first and second gear plates 70 and 72 have teeth on their circumferential inner faces and are opposed to each other to accommodate a planetary gear set therebetween as seen in FIG. 12. A pivot shaft 76 is inserted into aligned center holes of the first and second gear plates 70 and 72. As seen in FIGS. 12 and 13, the pivot shaft 76 has one end on which an annular ring is fixed to act as a sun gear 78 of the planetary gear set. Pinion planets 80, 80 are disposed around the sun gear 78 and rotatably supported by a pinion carrier 82 in meshing engagement between the sun gear 78 and the ring gear portion of the first gear plate 70 and between the sun gear 78 and the ring gear portion of the second gear plate 72, as shown in FIGS. 12 and 14.

As shown in FIGS. 12 and 13, a gear 84 is fixedly coupled with the pivot shaft 76 outside the ring gear portion of the first gear plate 70, by a fastening nut 92. An annular spacer 86 is intervened between the gear 84 and the first gear plate 70. The gear 84 is formed integrally with a disc-like portion 88 projecting from a side face thereof. The disc-like portion 88 of the gear 84 is formed with an arcuate groove 90 extending along its peripheral edge as best seen in FIG. 13. The arcuate groove 90 is provided in a predetermined angular range as seen in FIG. 13, and receives a lock pin 106 of a solenoid operated unit 104 which is secured to the support arm 66 through brackets 100 and 102. The lock pin 106 is retractable into the solenoid operated unit 104 when the solenoid operated unit 104 is energized. The engagement of the lock pin 106 with the groove 90 of the gear 84 limits rotation of the support arm 66 relative to the base plate 62 within the predetermined angular range.

As best shown in FIG. 11, the gear 84 meshes with a gear 94 secured to one end of a counter shaft 96 rotatably supported by the support arm 66. An actuator knob 98 is secured to the other end of the counter shaft 96.

The gears 84 and 94 act as a gear train drivingly interconnecting the end of the counter shaft 96 and the pivot shaft 76.

Thus constituted reclining mechanism 60 allows the seat back 14 to be tiltable relative to the seat cushion 13 between an upright position and a reclined position. The upright and reclined positions are within predetermined angular ranges as indicated at $\theta 1$ and $\theta 2$ in FIG. 15, respectively. The angular range $\theta 1$ of the upright position corresponds to the predetermined angular range of the groove 90 of the gear 84.

As best shown in FIG. 13, the base plate 62 is formed with a reclining switch mount 64 to which a reclining switch 110 is secured through a bracket 112. The reclining switch 110 includes a switch actuator rod 114 extending outwardly from the reclining switch 110 toward a tab portion 68 of the support arm 66 as shown in FIGS. 11 and 13. The reclining switch 110 is designed to be turned on when the rod 114 comes into contact with the tab portion 68 of the support arm 66 by shifting the seat back 14 to the upright position. On the other hand, the reclining switch 110 is turned off when the rod 114 is out of contact with the tab portion 68 by shifting the seat back 14 to the reclined position. Thus, the reclining switch 110 serves for detecting whether the seat back 14 is shifted to the upright position or not.

Figure 16:
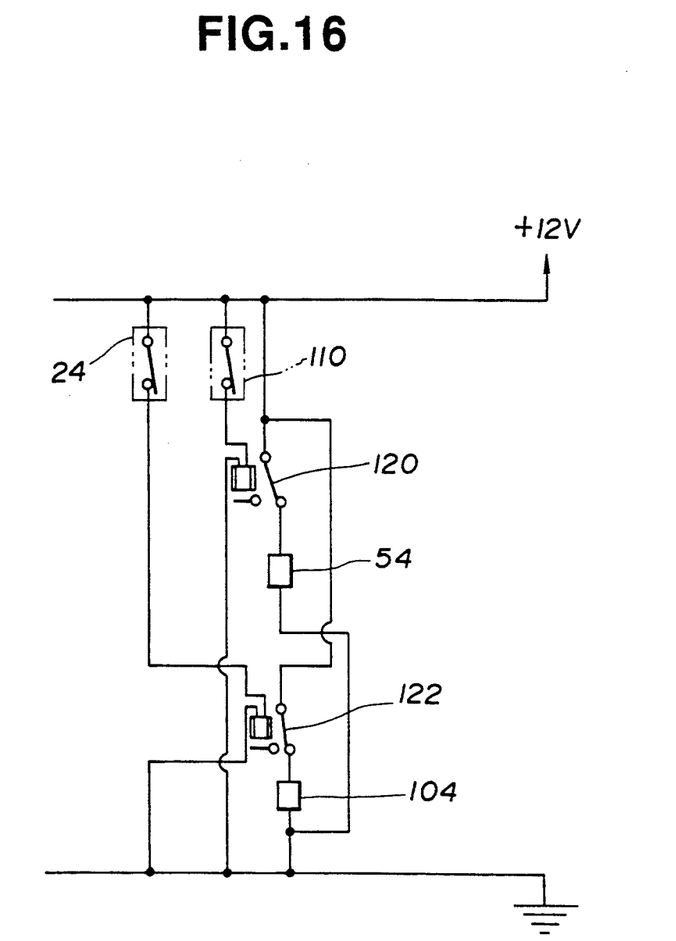
FIG. 16 is a circuit diagram of a system for controlling the seat back tiltable relative to the seat cushion.

Referring to FIG. 16, there is shown a circuit diagram of a system for controlling the seat back 14 shiftable relative to the seat cushion 13, according to the present invention. As shown in FIG. 16, the detent switch 24 is connected to +12 V power supply at its input terminal and to the solenoid operated unit 104 for the reclining mechanism 60 via a relay 122 at its output terminal. The reclining switch 110 is connected to +12 v power supply at its input terminal and to the solenoid operated unit 54 for the shift lever 22 via a relay 120 at its output terminal.

Figure 15:
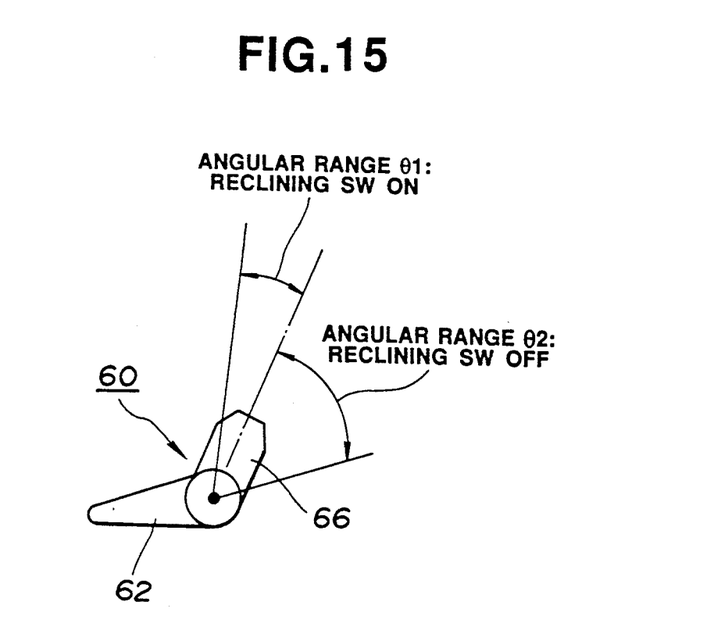
FIG. 15 is a schematic view of the reclining mechanism, showing two angular ranges of displacement of a seat back relative to a seat cushion.

When the shift lever 22 is located in the parking position 18A as seen in FIG. 10, the detent switch 24 is turned on and the solenoid operated unit 104 is energized via the relay 122. The lock pin 106 of the solenoid operated unit 104 is retracted to be disengaged from the arcuate groove 90 of the gear 84 of the reclining mechanism 60. Accordingly, when the actuator knob 98 of the reclining mechanism 60 is rotated together with the gear 94 connected thereto through the counter shaft 96, the gear 84 meshing with the gear 94 rotates in a direction reverse to that of the gear 94. The pivot shaft 76, to which the gear 84 is secured, rotates together with the sun gear 78 thereon in same direction as that of the gear 84. The pinion planets 80, 80 rotate relative to the sun gear 78 in meshing relation to the sun gear 78 and the ring gear portion of the second gear plate 72. The support arm 66 connected with the second gear plate 72 is rotated relative to the pivot shaft 76. Accordingly, the seat back 14 of the front seat 11 is allowed to be tiltable relative to the seat cushion 13 within the whole angular range including the ranges $\theta 1$ and $\theta 2$ as indicated in FIG. 15.

When the shift lever 22 is located in one of the shift positions 18B, 18C and 18D as indicated in FIG. 10, the detent switch 24 is turned off. The solenoid operated unit 104 is de-energized via the relay 122. The lock pin 106 projects outwardly to be engaged with the groove 90 of the gear 84 of the reclining mechanism 60. As a result, the seat back 14 is allowed to be placed at the upright position and tiltable relative to the seat cushion 13 within the angular range $\theta 1$, but prevented from shifting to the reclined position.

When the shift lever 22 is located in the parking position and the seat back 14 of the front seat 11 is placed at the upright position, the reclining switch 110 is turned on and the solenoid operated unit 54 for the shift lever 22 is energized via the relay 120. The lock pin 56 of the solenoid operated unit 54 retracts into the solenoid operated unit 54 to rotate the sleeve 44 such that the shift position pin 36 is aligned with the groove 46, 46. Accordingly, the shift lever 22 is unlocked to be shiftable from the parking position 18A to one of the shift positions 18B to 18D as indicated in FIG. 10.

When the shift lever 22 is located in the parking position 18A and the seat back 14 is placed at the reclined position, the reclining switch 110 is turned off and the solenoid operated unit 54 for the shift lever 22 is de-energized via the relay 120. The lock pin 56 of the solenoid operated unit 54 projects outwardly to rotate the sleeve 44 such that the shift position pin 36 is misaligned with the grooves 46, 46. As a result, the shift lever 22 is locked in the parking position 18A so that the shifting operation of the shift lever 22 to one of the shift positions 18B to 18D is restricted.

As is obvious from the above description, the reclining mechanism according to the present invention is capable of controlling a seat back of a front seat which is tiltable relative to a seat cushion thereof, depending upon a position of a shift lever. Further, the system according to the present invention restricts shifting of the shift lever from a parking position to other driving positions in a case where the seat back is tilted relative to the seat cushion beyond a predetermined angular range.

What is claimed is:

1. In a motor vehicle:
   a manual shift lever having a plurality of shiftable positions including a parking position;
   a reclining seat including a seat cushion and a seat back, said seat back having an upright position and a reclined position;
   first sensor means for detecting whether said shift lever is placed at said parking position or not and generating a parking position indicative signal when said shift lever is placed at said parking position;
   means for preventing said seat back from shifting toward said reclined position in response to absence of said parking position indicative signal;
   second sensor means for detecting whether said seat back is shifted to said upright position or not and generating an upright position indicative signal when said seat back is shifted to said upright position; and
   means for preventing said shift lever from moving out of said parking position in response to absence of said upright position indicative signal.

2. In a motor vehicle:
   a manual shift lever having a plurality of shiftable positions including a parking position;
   a reclining seat including a seat cushion and a seat back, said seat back having an upright position and a reclined position;
   first sensor means for detecting whether said shift lever is placed at said parking position or not and for generating a parking position indicative signal when said shift lever is placed at said parking position;

means for preventing said seat back from shifting toward said reclined position in response to an absence of said parking position indicative signal and for allowing said seat back to shift toward said reclined position in response to a presence of said parking position indicative signal;

second sensor means for detecting whether said seat back is shifted to said upright position or not and for generating an upright position indicative signal when said seat back is shifted to said upright position; and means for preventing said shift lever from moving out of said parking position in response to the absence of said upright position indicative signal.

3. In a motor vehicle:

a manual shift lever having a plurality of shiftable positions including a parking position;

a reclining seat including a seat cushion and a seat back, said seat back having an upright position and a reclined position;

first sensor means for detecting whether said shift lever is placed at said parking position or not and for generating a parking position indicative signal when said shift lever is placed at said parking position;

means for preventing said seat back from shifting toward said reclined position in response to an absence of said parking position indicative signal;

second sensor means for detecting whether said seat back is shifted to said upright position or not and for generating an upright position indicative signal when said seat back is shifted to said upright position; and means for preventing said shift lever from moving out of said parking position in response to the absence of said upright position indicative signal and for allowing said shift lever to move out of said parking position in response to a presence of said upright position indicative signal.

4. In a motor vehicle:

a manual shift lever having a plurality of shiftable positions including a parking position, a neutral position and a drive position;

a reclining seat including a seat cushion and a seat back, said seat back having an upright position and a reclined position;

first sensor means for detecting whether said shift lever is placed at said parking position or not and generating a parking position indicative signal when said shift lever is placed at said parking position, said first sensor means failing to generate said parking position indicative signal when said shift lever is placed at one of said neutral and drive positions;

means for preventing said seat back from shifting toward said reclined position in response to an absence of said parking position indicative signal, but allowing said seat back to shift toward said reclined position in response to a presence of said parking position indicative signal;

second sensor means for detecting whether said seat back is shifted to said upright position or not and generating an upright position indicative signal when said seat back is shifted to said upright position, said second sensor means failing to generate said upright position indicative signal when said seat back is at said reclined position; and means for preventing said shift lever from moving out of said parking position in response to an absence of said upright position indicative signal, but allowing said shift lever to move out of said parking position to one of said neutral and drive positions in response to a presence of said upright position indicative signal.

5. A combination comprising:

a manual shift lever having a plurality of shiftable positions including a parking position;

a seat including a seat back having an upright position and a reclined position;

first sensor means for detecting whether the shift lever is placed at said parking position or not and for generating a parking position indicative signal when the shift lever is placed at the parking position;

means for preventing the seat back from shifting toward the reclined position in response to an absence of the parking position indicative signal;

second sensor means for detecting whether the seat back is shifted to the upright position or not and for generating an upright position indicative signal when the seat back is shifted to the upright position; and means for preventing the shift lever from moving out of the parking position in response to the absence of said upright position indicative signal.

6. A system for controlling a seat back which is shiftable relative to a seat cushion between an upright position and a reclined position, the system comprising:

means for generating an output signal;

means for preventing the seat back from shifting toward the reclined position in response to an absence of said output signal;

means for detecting whether the seat back is shifted to said upright position or not and for generating an upright position indicative signal when the seat back is shifted to said upright position;

a manual shift lever having a plurality of positions and being shiftable between said plurality of positions thereof; and means for locking said manual shift lever in at least one of said plurality of positions and for allowing said manual shift lever to shift between said plurality of positions in response to a presence of said upright position indicative signal and the absence of said output signal.

7. A system as claimed in claim 6, wherein said preventing means has a solenoid operated unit adapted to be fixed to the seat back, said solenoid operated unit including a lock pin, and groove means for receiving said lock pin when said seat back is shifted to said upright position.

8. A system as claimed in claim 7, wherein said detecting means has a switch including a switch actuator rod, and abutment means fixed to said seat back for contacting with said switch actuator rod to turn on said switch when said seat back is shifted to said upright position.

* * * * *